UNITED STATES PATENT OFFICE.

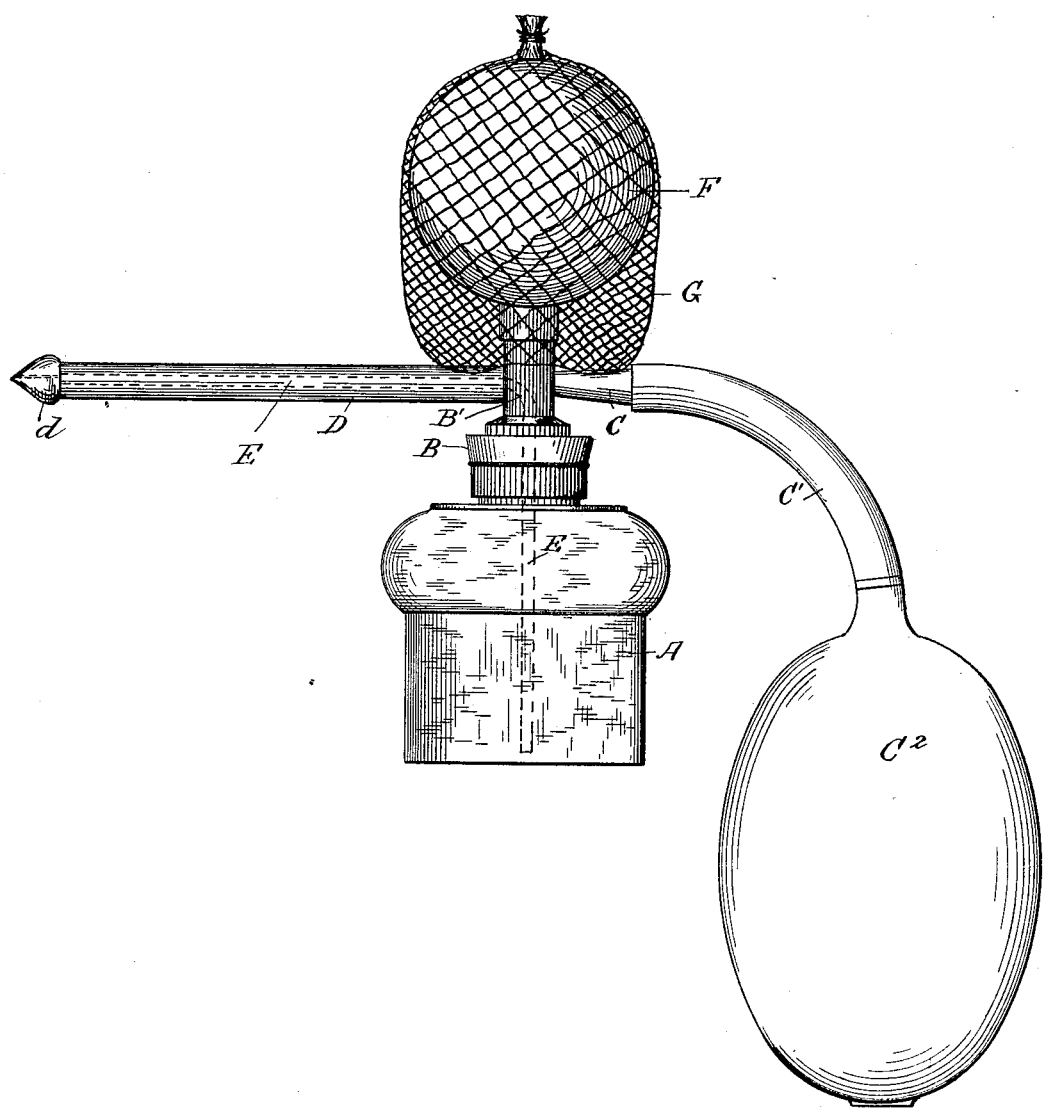

THOMAS EDWIN OGRAM, OF WASHINGTON, DISTRICT OF COLUMBIA.

SYRINGING APPARATUS.

SPECIFICATION forming part of Letters Patent No. 386,555, dated July 24, 1888.

Application filed December 9, 1887. Serial No. 257,402. (No model.)

*To all whom it may concern:*

Be it known that I, THOMAS EDWIN OGRAM, a citizen of the United States, residing at Washington, in the District of Columbia, have invented certain new and useful Improvements in Syringing Devices; and I do hereby declare the following to be a full, clear, and exact description of the invention, such as will enable others skilled in the art to which it appertains to make and use the same.

My invention relates to an improvement in syringing devices; and it consists in the construction and arrangements of parts hereinafter described, and pointed out in the claims.

The object of my invention is to provide a device to be used for nasal douching, throat-spraying, and syringing purposes generally, which will be so constructed as to produce a continuous and regular discharge of the fluid, instead of a pulsatory or intermittent flow; and also which will be easily handled and operated and cheaply manufactured. I attain this object by the device illustrated in the accompanying drawing, wherein is shown a side elevation of my device.

In the drawing, A represents a receptacle having a detachable hollow cap, B, secured to the neck thereof, which is provided with a tube, B', leading out from its upper or top portion, thereby forming a continuous opening which extends through said tube and cap into the receptacle. Extending out from opposite sides, a short distance from the upper end of tube B', are arms C and D, which are constructed with hollow centers communicating with the center of the hollow tube B' and extending out at an angle from said tube. The arm C has the flexible end of a rubber tube, C', secured to its outer end, which is in turn connected to a valved bulb or bellows, $C^2$, of the ordinary form of construction, for forcing air into the receptacle. The arm D is made somewhat greater in length than arm C, and has secured to its outer end an atomizing or spraying nozzle, $d$. This arm is preferably of rigid construction, as would be required when used for the throat; but when used for other purposes may be constructed differently or made flexible. Situated within the arm D, with its outer end adjacent to the opening in the nozzle $d$, is a liquid-conducting tube, E, (shown in dotted lines,) which extends the entire length of said arm and is bent down and extended through the tube B' and cap B into the receptacle, where it terminates in close proximity to the bottom thereof. This tube is constructed of small diameter, so as to be readily passed through the cap B and tube B' and still reserve sufficient space for the passage of air through said tube and cap. The outer end of the tube E is securely packed to prevent any backflow of liquid through arm D or the escape of air through the same. It may also be packed at the inner end of arm D, which is intended to act as a support or protector for the tube E. Secured to the upper end of tube B', and into which said tube leads, is a flexible bulb, F, constructed of thin rubber, which admits of ready expansion and contraction, for purposes hereinafter stated. Surrounding bulb F is a net, G, of a size large enough to admit of the inflation of the bulb to its greatest extent, but which prevents the same from expanding beyond a point which would result in its bursting.

The operation of the device is as follows: When the receptacle A is to be filled, the cap B is removed and replaced when the required amount of fluid is placed in the receptacle. The bulb or bellows $C^2$ is then manipulated, forcing air into the receptacle and bulb F, thereby forcing the liquid into tube E and out of nozzle or sprayer $d$. By a rapid manipulation of bulb $C^2$ a greater amount of air is introduced into the receptacle and bulb than is required to force the liquid out or to keep a constant pressure on the liquid, and at the same time occupy the space caused by its misplacement. Consequently the surplus air is forced into the bulb F, which is expanded to its greatest extent, or until it comes in contact with the netting G. The injection of air is then stopped and the hand of the operator freed to assist in placing the nozzle in the desired position, the fluid being discharged constantly by the force of the air in the bulb F, which, owing to its elasticity, contracts, thereby forcing the air contained therein out onto the liquid in the receptacle, and thus supplying force enough to maintain a continuous and regular flow of the liquid from out the nozzle. As the force thus exerted on the liquid, which, owing to the minute size of the opening in the nozzle is of considerable duration, is about to cease, the bulb C² is again manipulated and the bulb F again expanded. A continuous stream of liquid is thus maintained until the operation is completed.

By placing the bulb F in the position stated I have found it most convenient; but it is evident that it may be placed in any other position between the liquid and the air-supplying bulb.

I am aware that many minor changes in the construction and arrangement of the parts of my device can be made and substituted for those shown and described without in the least departing from the nature and principle of my invention.

Having thus described my invention, what I claim as new, and desire to secure by Letters Patent, is—

1. In a syringing device, the combination, with a liquid-holding vessel, of an expansible air-storage bulb secured to and communicating directly with the interior of the vessel, and an air-supply tube connected to the vessel at a point adjacent to and independent of said bulb and communicating directly with the interior of the vessel and bulb, substantially as described.

2. In a syringing device, the combination, with a liquid-holding vessel, of a removable hollow cap situated thereon, an expansible air-storage bulb secured to said cap, and an air-supplying bulb secured to said cap at a point adjacent to said storage-bulb, said cap forming a direct communication for the storage-bulb with the air-supply and the interior of the vessel, substantially as described.

In testimony whereof I affix my signature in presence of two witnesses.

THOMAS EDWIN OGRAM.

Witnesses:
JAMES P. STABLER,
H. J. LAUCK.